Oct. 19, 1965        E. M. CROWELL        3,212,115
ADHESIVE BONDING PROCESSES

Original Filed July 10, 1959        2 Sheets-Sheet 1

Inventor
Ernest M. Crowell
By his Attorney
Benjamin C. Pollard

Oct. 19, 1965  E. M. CROWELL  3,212,115

ADHESIVE BONDING PROCESSES

Original Filed July 10, 1959  2 Sheets-Sheet 2

United States Patent Office 3,212,115
Patented Oct. 19, 1965

3,212,115
ADHESIVE BONDING PROCESSES
Ernest M. Crowell, Beverly, Mass., assignor to United Shoe Machinery Corporation, Boston, Mass., a corporation of New Jersey
Original application July 10, 1959, Ser. No. 826,152, now Patent No. 3,090,772, dated May 21, 1963. Divided and this application Oct. 18, 1962, Ser. No. 231,523
9 Claims. (Cl. 12—145)

This invention relates to adhesive bonding processes and in particular to processes of cement lasting portions of shoe uppers.

This application is a division of my copending application Serial No. 826,152, filed July 10, 1959 and entitled "Resinous Adhesive Rods," now U.S. Patent 3,090,772.

Thermoplastic adhesives are well known in the art. These materials are usually hard and non-tacky at room temperature and are softened or melted by application of heat to bring them to a condition in which they will wet or stick to surfaces with which they are brought in contact. When contact is established, they are allowed to cool and harden to bond the surfaces.

Thermoplastic adhesive bonding is effective in many relations but as heretofore known it has suffered from certain inherent disadvantages. Thus there are limitations in the softening point of adhesives which can be used due to the nature of the adhesive and/or the nature of the surfaces being bonded. In many instances thermoplastic adhesives resoften and fail at temperatures involved in treatment or use of bonded structures. Adhesives which are sufficiently fluid for application when molten are often brittle or weak when solidfied. Also, thermoplastic adhesives are ordinarily softened or weakened by organic solvents which may contact the adhesive in subsequent treatment of a bonded article. Adhesives which harden quickly on cooling create critical problems in assembling surfaces before the adhesive has cooled to non-adhesive condition.

It is an object of the present invention to provide a novel thermoplastic adhesive body and to bond surfaces by application of the thermoplastic adhesive under special temperature and handling conditions effective to enable assembly of surfaces to be bonded in a practicable time and to cause the adhesive to set up with extreme rapidity after assembly between surfaces to a strong, tough, heat- and solvent-resistant condition.

In the method of the present invention a crystallizable and work-orientable, linear resin free from side chains is deposited at a temperature above its crystal melting point as a body of substantial thickness onto a surface to be bonded. The body of resin is supercooled to a temperature below its crystallization temperature but above its second order transition point, where it is still amorphous, deformable, and capable of forming a bond to a surface. A second surface is laid down on the resin and pressure is applied to the assembly to spread out the resin body between the surfaces while the resin is in this condition. Alternatively the resin may be introduced between two surfaces to be bonded, supercooled to the same condition, and thereafter spread between the surfaces by applying pressure to the assembly. The deformation of spreading out the adhesive body orients the molecules of the deposited adhesive and induces crystallization to make the adhesive bond stronger and tougher.

Practical operation of the method depends on the special properties of the resin. A resinous copolyester of a major proportion of terephthalic acid and a smaller proportion of isophthalic acid possesses the desired special combination of properties to give the novel physical action involved in the bonding process. To give special rapid melting with extended open time characteristics the copolyester is provided in the form of small cross section bodies of amorphous resinous material.

The bonding process is particularly adapted for cement toe lasting processes and the invention will be described more fully for this use but it will be understood that the process is useful in other relation.

Reference is made to the drawings forming part of the disclosure of the present invention in which, FIG. 1 is an angular view of the forepart of a shoe the sides of which have been lasted and the lasting margin of the lining and toe box trimmed away and also showing the adjacent portions of a lasting machine, and showing the application of molten adhesive at the joint between the insole and the lasting margin of the upper;

Figure 1:
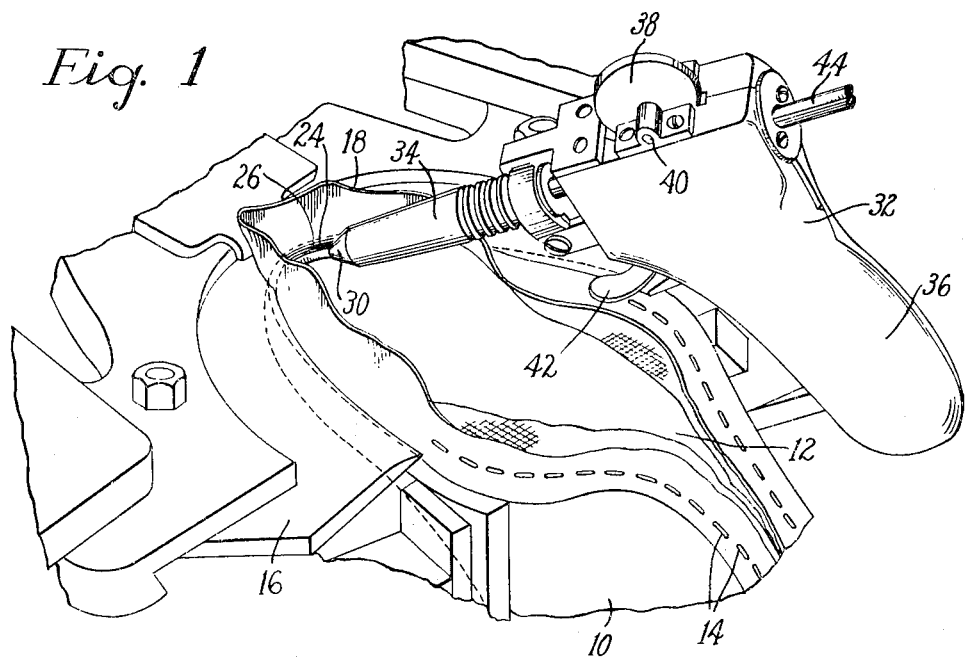
Figure 2:
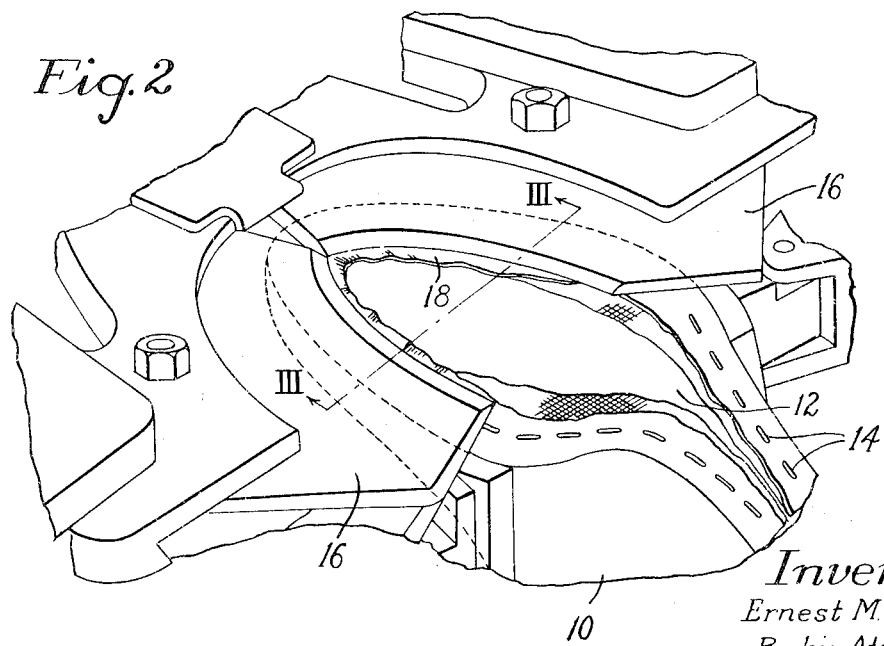
FIG. 2 is a similar view showing the wipers of the lasting machine in closed position in which they have wiped over the lasting margin and pressed it against the insole.

I have discovered a method for making very strong, tough bonds with an adhesive comprising resinous material which is readily supercooled and of which the molecules are readily oriented by deformation in supercooled condition so that crystallization of the oriented molecules can occur rapidly. Preferred resins are the linear copolyesters formed by reacting glycols of the series $HO(CH_2)_nOH$ (where $n$ is an integer greater than one but not exceeding 10), with mixed isophthalic and terephthalic acids, their methyl esters, or their acid glycols. The resinous material is heated to a temperature above its melting point and deposited on a surface of an object to be bonded as a body of substantial thickness relative to the final thickness of adhesive desired in the joint. After application, the molten material is cooled below its crystallization temperature without the development of crystals, i.e., the material is supercooled. Thereafter, but while the deposited material is above its second order transition temperature, a surface of a second object is laid down on the deposited material. Pressure is applied to force the surfaces of the objects toward each other to deform the deposited material to cause it to flow between the surfaces and bond to them. The deformation of the deposited material orients the molecules along the direction of flow and induces crystallization so that the deposited material is brought to oriented crystalline condition in which it is tougher and stronger than in unoriented condition.

Polyesters of terephthalic acid with glycols of the series $HO(CH_2)_nOH$ (where $n$ is an integer greater than one but not exceeding 10) are linear in structure, free from branching and are composed of molecules with recurring units of the general formula

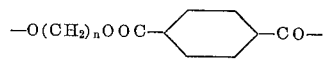

These polyesters are high melting, difficulty soluble resins and, because of the straight line arrangement of the molecule, crystallize very readily and are normally crystalline in solid condition. When such resins are cold drawn, the molecules, because of their structure, are oriented parallel to the axis of drawing. The oriented material shows greatly increased strength and toughness over the unoriented material and this characteristic has led to the use of oriented filaments of these polyesters as textile fibers.

Copolyesters of terephthalic acid and isophthalic acid with glycols of the series $HO(CH_2)_nOH$ are also linear in structure with groups of one or more terephthalic units of the general formula

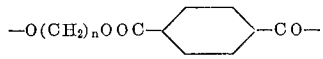

alternating with groups of one or more isophthalic units of the general formula

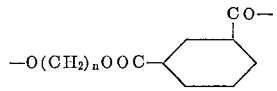

Copolyesters of the glycols $HO(CH_2)_nOH$ where $n$ is an even number greater than one but not over 10 are superior to glycols where $n$ is an odd number, the preferred glycols having from 2 to 6 carbon atoms. The copolyesters have lower melting points than the simple terephthalate polyesters of similar molecular weight. The copolyesters melt to Newtonian fluids which have low surface tension. The low surface tension is apparently due to the nonpolar character of the constituent groups of the copolyesters. Wetting of surfaces to establish good adhesive engagement results from the low surface tension of the copolyester. Also, because of the departure from straight line arrangement of the molecule at the isophthalate residues, the molecules aline themselves less readily and do not pack as readily with adjacent molecules as do simple terephthalate polyesters so that the copolyester material has markedly reduced tendency to crystallize relative to the terephthalate polyester. The copolyester resins also have a very large temperature difference, which may be of the order of 100° C. between the crystal melting point and the second order transition temperature.

Although the copolyester has less tendency to crystallize than the simple terephthalate polyester, it is oriented very easily by mechanical deformation and crystallizes rapidly in oriented condition. The crystalline copolyester exhibits much of the high strength, toughness and freedom from cold flow or creep of the simple polyester.

The reduced tendency to crystallize is important in the present bonding method since it enables the molten polyester to be deposited on a surface and to be supercooled and to remain in amorphous state capable of forming bonds for a period of time long enough for bringing a second surface down on the adhesive. That is, in the temperature range between the crystallization temperature and the second order transition temperature the supercooled amorphous material can be spread and can flow into wetting, bond forming engagement with surfaces to be bonded.

The ability of the material to flow into wetting engagement with surfaces to be bonded decreases as the material cools toward its second order transition temperature and best results are secured where the material is spread at temperatures at least about 20° C. above its second order transition temperature. Also, to secure a bond which sets rapidly to strong oriented crystalline condition after spreading, it is desirable that the material be supercooled at least about 20° C. below its crystal melting point.

The second order transition temperature is a temperature determinable by changes in the slope of the curves in which the specific gravity or the specific volume is plotted against temperature.

The second order transition is an easily determinable temperature for a given sample of resin; but it will be understood that the previous physical treatment, i.e. melting and crystallization history of the sample is reflected in the value obtained. Slight variations in the value may also result from changes in the conditions of the determination such as change in the rate of heating when changes in the rate coefficient of expansion are being measured. This variation may be of the order of 2° or 3° C. In simpler terms, the second order transition temperature is the temperature above which the resinous material is capable of plastic flow under pressure to establish bonding relation with a surface, and below which the resinous material is resilient and no longer capable of plastic flow under pressure to establish a bond. Because the temperature difference between the crystal melting temperature and the second order transition temperature is large with the present resinous materials, substantial time is available between the time of application of the molten resinous material and the time when that resinous material has cooled below the second order transition temperature.

When a relatively thick body of adhesive on a surface is deformed as by pressing a second surface against the body and to squeeze the body out between the surfaces, the molecules of the copolyester are oriented. The oriented copolyester material crystallizes very rapidly so that the material when in the temperature range between the second order transition temperature and the melting point sets up almost immediately. On crystallization, the material which was originally clear becomes greyish and opaque. The crystallized material is strong and tough and, since it was in supercooled condition and above the second order transition temperature it has established intimate adhesive engagement with the surfaces to be bonded so that an exceptionally satisfactory bond is obtained. It is a further advantage of the bond established that the bond will resist heat. That is, it is not materially softened or weakened by temperatures below the crystallization temperature. A further unique property of the bond is that the terephthalate-isophthalate copolyester although a thermoplastic material differs from most thermoplastic materials in that it is insoluble in any of the ordinary organic solvents such as ketones, esters, ethers, naphthas and so on. Thus a bond is unaffected by solvent constituents of finishes, cleaning agents or other adhesive materials which may come in contact with the adhesive layer.

It has been found that the time during which deposited molten copolyester resin will remain in amorphous condition after application and while in the temperature range between the second order transition temperature and the crystallization temperature depends to a considerable extent on the previous melt history of the copolyester resin. Thus, where a crystallized resin mass is melted rapidly and allowed to cool after being held at high temperature for only a short time, it is found that the resin is difficult to supercool to amorphous state and that the resin crystallizes easily and fast. On the other hand, where the resin is melted whether from crystalline or amorphous condition and held in molten condition for a substantial time, it is found that the mass is easily supercooled and crystallizes relatively slowly. Where an amorphous material is melted rapidly and allowed to cool, whether held at high temperature for only a short time or for an extended period, the mass is easily supercooled and crystallizes relatively slowly. Resinous copolyester, either in the molten condition in which it is initially formed and in which it has never crystallized, or in a body which has been held at high temperature for a substantial time to melt substantially all crystallites, is supercooled without crystallization very rapidly and brought down to a temperature, e.g. room temperature, at which the freedom of movement of the molecules is reduced to a point at which crystallization will not occur. This may be done by forming a thin cross section stream of the material in molten condition and quenching it immediately in water. Preferably, the molten material may be forced through a die and quenched in the form of a thin flexible rod of uniform cross section with a thickness preferably in the range of ⅛ to ⅜ inch. The rod is stiffly resilient, non-tacky, glossy and ordinarily at least semi-transparent. In this form the resin may be melted rapidly to fluid condition, applied, whether held at high temperature for a short time or a long time, and deposited in a form which is easily supercooled and crystallizes relatively slowly.

A further factor which affects the tendency to crystallize is the relative proportion in which the terephthalate and isophthalate components are present in the copolyester. Within the range of about 90:10 to 60:40 mol percent of terephthalate to mol percent isophthalate of the acid component reacted to form the polyester the desired delay in crystallizing coupled with rapid crystallization after mechanical deformation is obtained. In this range, the higher the percentage of terephthalate, the more rapid will be the crystallization. A copolyester preferred for the toe lasting of shoes is formed by the reaction and polymerization of the methyl esters of terephthalic acid and isophthalic acid in the ratio of 82.5 mol percent to 17.5 mol percent with 1,4 butanediol. The ester interchange and polymerization is carried out to form a copolyester having a melt viscosity as determined by the Brookfield Viscometer, Model RVF, at 240° C. with a No. 7 rotor at 20 r.p.m. of from 800 to 1300 poises.

Copolyester resins which have been found particularly useful have crystal melting points in the range of 160° to 218° C., preferably from 170° to 200° C., melt viscosities at 238° C. using the Brookfield Viscometer with a No. 7 rotor at 4 r.p.m. in the range of 500 to 2500 poises, preferably 800 to 1300 poises, and second order transition temperatures of 20° C. to 40° C.

Figure 3:
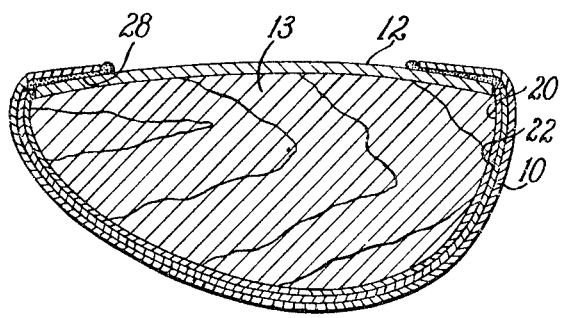
FIG. 3 is a cross sectional view of the toe portion of the shoe which has been lasted according to the method of the present invention.
Figure 4:
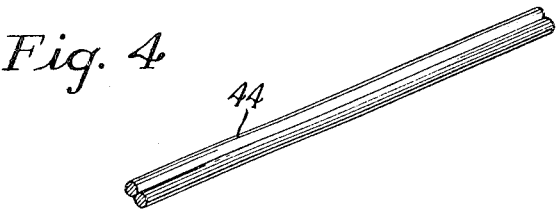
FIG. 4 is a side view of a rod of amorphous adhesive useful in the process of the present invention.

In carrying out the bonding process for the lasting portion of shoe uppers, for example toe portions, using the new copolyester resin adhesives, a shoe upper 10 and insole 12 are assembled on a last 13, pulled over, and the side, shank, and rear portions lasted in any convenient manner, for example with staples 14, along the sides of the shoe. The toe portion of the shoe 10 is usually subjected to a toe steaming operation to increase the moisture content and soften the shoe upper material such as leather to facilitate lasting. The partially lasted shoe 10 is fitted to the bed lasting machine jack (not shown), the lasting wipers 16 for the toe end are adjusted and the operator pulls out any tacks which might interfere with the lasting. The toe portion is then subjected to preliminary lasting and wiping actions to take out stretch of the upper material and pull the upper 10 snugly to the toe of the last. The margin 18 of the upper 10 is opened out and surplus lining 20 and box toe 22 material (see FIG. 3) are trimmed away, for example by means of a hand knife.

The special molten resin adhesive is deposited along the joint 24 between the margin 18 and the insole 12 as a body 26 of substantial thickness relative to the area covered. Preferably, the thickness of the body 26 is at least about twice the desired final thickness of the film 28 (see FIG. 3) of adhesive in the lasted shoe upper 10. This may be done conveniently by extruding a continuous bead or band of the molten material from a round opening in the conical nozzle 30 of a hand operated heated extruder gun 32. As shown in FIG. 1, the gun comprises a heated barrel 34 mounted on a handle 36. Feed wheel 38 is mounted in bearings 40 at the top of the gun. The feed wheel 38 is actuated by finger pressure on the trigger 42 to force a thin, uniform cross section rod 44 of thermoplastic resin into the heated barrel 34 where it is progressively melted to liquid condition. Forcing further portions of the rod 44 into the barrel 34 creates pressure through the piston action of solid portions of the rod to extrude molten portions of the resin from the nozzle 30 for deposition on a surface. Other depositing devices may be used such for example as the cement applying device described in the patent to Jorgenson No. 2,324,510 in which molten cement is deposited as a series of beads in the desired location.

The deposited body 26 of cement is supercooled by transfer of heat both to the surfaces of the insole 12 and margin 18 and to the atmosphere. Promptly after deposition of the body 26 of the molten resinous adhesive and while the adhesive is in supercooled condition but above its second order transition temperature, the lasting wipers 16 are actuated to wipe the margin 18 of the upper 10 over onto the insole 12. The wiping action deforms the deposited body 26 of supercooled adhesive and causes it to spread as a thin layer between the overlasted margin 18 of the upper and the insole 12. Also the portions of the margin 18 of the shoe upper first wiped over are stretched and move slightly relative to the insole as the wipers 16 wipe over further portions of the margin 18. The heat of the adhesive softens the wiped over material so that it lies very flat against the insole 12 and exhibits only very fine pleats 45 accommodating the excess material wiped over. For lasting some materials, it is possible to use heated wiper blades to give improved conformations without interfering with the bonding process. The wiper blades 16 may be released almost at once and the lasted over material will remain firmly in place. In the resultant toe the solidified thermoplastic material bonds so firmly to the toe materials, both the lining 20 and box toe 22 of which only the edge is exposed and the margin 18 and insole 12 of which flat surfaces are available for bonding, that the cement in effect forms a continuation of the materials over the insole. That is, the toe materials and adhesive form a continuous band all around the toe which is something more than just a bond formed between wiped over portions and the insole. A lasted toe if opened up with the aid of pliers will show both very strong union between the lasted over portions and the insole and also the effect of the adhesive as a continuation of the box toe 22 and lining 20 portions of the toe. The adhesive material of the film 28 is in oriented crystalline condition as a result of the deformation of the adhesive both by the spreading action of the wipers and by the movement of the lasted over upper material relative to the insole.

While the use of the bonding process has been described as it relates particularly to toe lasting, it will be understood that the process is useful for lasting other portions of shoes, for example side lasting and heel seat lasting. Also the process is useful for bonding surfaces other than shoe surfaces.

The following example is given to aid in understanding the invention but it is to be understood that the invention is not restricted to the particular times, temperatures, proportions, components or other details of the example:

*Example*

2.2 mols of 1,4 butanediol were mixed with .825 mols of the methyl ester of terephthalic acid and .175 mols of the methyl ester of isophthalic acid. The mixture was disposed in a closed kettle and heated to 120° to 140° C. while bubbling nitrogen therethrough to remove oxygen. This step was carried on for 20 minutes. Thereafter 0.1% by weight based on the weight of the mixture of lead peroxide was stirred in and the mixture heated to a temperature of 120° to 140° C. for about 3 hrs., during which time methyl alcohol displaced from the esters by the butanediol boiled off and was collected. Thereafter the temperature was raised to 180° to 220° C. and further methyl alcohol was removed. When evolution of methyl alcohol substantially stopped, vacuum was applied to the heated reaction mixture and remaining methyl alcohol and excess butanediol boiled off.

Heating was continued and the temperature raised to between 245° C. and 260° C. to effect further polymerization of the polyester in the kettle. This heating was continued for 4 hrs. at the end of which time the melt viscosity of the material at 240° C. was about 1200 poises as determined on the Brookfield Viscometer, Model RVF, using the No. 7 rotor at 20 r.p.m.

The molten material was extruded as a stream of relatively thin cross section, i.e. approximately 1/8" as its major thickness. The stream was plunged into cool water directly after extrusion and solidified as a continuous, resiliently flexible, substantially clear, transparent rod of amorphous resin which was collected in a coil for subsequent use.

A length of the amorphous rod was tested to determine the second order transition temperature through observation of changes in length on heating the rod by immersion in a silicone oil bath. The rod was clamped at one end and a cathetometer employed to observe the increase in length of the rod as the temperature was raised. Heat to increase the temperature of the silicone oil bath was supplied by an immersion type heater and the temperature of the bath was kept uniform by a mechanical stirrer. The temperature of the bath was raised one-third of a degree centigrade per minute and the change in length observed after each rise in temperature. It was found that the change in length was substantially linear from 5° to 32.5° C. having a slope of 0.014 mm. per degree C. At 32.5° C. the slope of the curve of length v. temperature increased, i.e. there was a greater increase in length per degree rise and the change in length was substantially linear from this temperature to 65° C. where the test was discontinued. The slope of the curve above 32.5° C. was 0.023 mm. per degree C. The change in slope shows a second order transition temperature for the resin rod of 32.5° C.

A portion of the resin was caused to randomly crystallize turning it opaque and a piece of the opaque material placed in a melting point determination device. Operated in accordance with standard conditions, first indications of melting, i.e. a slight translucency in the material, were observed at 183° C. and melting (turning transparent) was complete at 194° C.

A shoe upper and insole were assembled on a last, pulled over and the side, shank and rear portions lasted by conventional procedure. The toe portioin of the shoe was subjected to toe steaming and the partitally lasted shoe was fitted to the jack of a bed lasting machine. The lasting wipers for the toe end were adjusted, interfering tacks were removed, and the toe portion was subjected to preliminary lasting and wiping to take the stretch out of the upper material and pull the upper snugly to the toe of the last. The margin of the upper was opened out and surplus lining and box toe material trimmed away.

The amorphous rod prepared as described above was supplied to a heated extrusion gun in which the rod was brought to molten condition and extruded at a temperature of about 400° F. The extruded material was deposited along the joint between the toe material and insole as a bead approximately ⅛" in thickness. Promptly thereafter, while the deposited bead of resin was at a temperature of about 120° C., the lasting wipers were actuated to wipe the lasting margin of the upper material over onto the insole. The wiping action spread the deposited bead of resinous material as a thin layer between the overlasted upper material and the insole. It was observed that the resinous material after spreading was no longer a clear body but was a greyish opaque solid material. The wipers were released promptly after the lasting operation and it was found that the wiped over upper material lay very flat against the insole and exhibited only very fine pleats accommodating the excess material wiped over.

The shoe was completed by conventional procedure and showed no tendency to soften under the action of a sole attaching cement containing active solvents.

A shoe upper toe lasted according to the procedure above described was opened up with the aid of pliers and it was found that the layers could not be separated without destruction. Portions of the adhesive adhered strongly to the cut edges of the box toe and doubler so that the adhesive constituted in effect a continuation of the box toe and doubler holding them firmly in place.

Having thus described my invention, what I claim as new desire to secure by Letters Patent of the United States is:

1. The method of bonding which comprises depositing a relatively thick body of molten adhesive comprising a work-orientable resin on a surface, the resin molecules being linear, free from side chains and readily crystallizable, supercooling the adhesive to a temperature below its crystallization temperature but above its second order transition temperature, pressing said body of supercooled adhesive between said surface and a second surface to distort the body of adhesive, said distortion being effected while the deposited adhesive is above its second order transition temperature and is still amorphous but is below the crystal melting temperature, said distortion inducing crystallization and effecting orientation of the molecules of the deposited adhesive to increase the tensile strength and toughness of the adhesive.

2. The method of bonding which comprises depositing a relatively thick body of molten adhesive comprising a resinous copolyester of isophthalic and terephthalic acids with a straight chain glycol having its hydroxyl groups on terminal carbon atoms, the carbon chain of said glycol having from 2 to 10 carbon atoms, on a surface, supercooling the adhesive to a temperature below its crystal melting temperature but above its second order transition temperature, pressing said body of supercooled adhesive between said surface and a second surface to distort the body of cement, said distortion being effected while the deposited cement is above its second order transition temperature and is still amorphous but is below the crystal melting temperature, said distortion inducing crystallization and effecting orientation of the molecules of the deposited cement to increase the tensile strength and toughness of the cement.

3. The method of bonding which comprises depositing a relatively thick body of molten adhesive comprising a resinous copolyester of isophthalic and terephthalic acids with a glycol of the series $HO(CH_2)_nOH$ where $n$ is an even number from 2 to 6, inclusive, on a surface, supercooling the adhesive to a temperature below its crystal melting temperature but above its second order transition temperature, pressing said body of supercooled adhesive between said surface and a second surface to distort the body of cement, said distortion being effected while the deposited cement is above its second order transition temperature and is still amorphous but is below the crystal melting temperature, said distortion effecting orientation of the molecules of the deposited cement and inducing crystallization to increase the tensile strength and toughness of the cement.

4. The method of bonding which comprises depositing a relatively thick body of molten adhesive comprising a resinous copolyester of terephthalic and isophthalic acids in the molar ratio of from 70:30 to 90:10 with 1,4 butanediol on a surface, supercooling the adhesive to a temperature below its crystal melting temperature but above its second order transition temperature, pressing said body of supercooled adhesive between said surface and a second surface to distort the body of deposited cement, said distortion being effected while the deposited cement is above its second order transition temperature and is still amorphous and capable of flow into wetting adhesive relation to said surfaces but is below the crystal melting temperature, said distortion inducing crystallization and effecting orientation of the molecules of the deposited cement to increase the tensile strength and toughness of the cement.

5. The method of bonding which comprises depositing a relatively thick body of molten adhesive comprising a resinous copolyester of terephthalic and isophthalic acids in the molar ratio of from 70:30 to 90:10 with 1,4 butanediol to a surface, said copolyester having a crystal melting temperature of from 170° to 200° C. and a second order transition temperature of from 20° to 40° C., supercooling the adhesive to a temperature below its crystallization temperature but above its second order transition temperature, laying down a second surface on the deposited cement and applying pressure to distort the body of deposited cement, said distortion being effected while the deposited cement is at least 20° C. above its second order transition temperature and is still amorphous and capable of flow into wetting adhesive relation to said surfaces but is at least 20° C. below the crystal melting temperature, said distortion inducing crystallization and effecting orientation of the molecules of the deposited cement to increase the tensile strength and toughness of the cement.

6. The method of lasting portions of a shoe upper which comprises depositing adjacent the edge of the insole of a partially lasted shoe a band of molten adhesive comprising a work-orientable resin, the resin molecules being linear, free from side chains and readily crystallizable, supercooling the deposited adhesive to a temperature below the temperature of crystal melting of the adhesive but above its second order transition temperature, promptly wiping the lasting margin of the shoe upper inwardly over and pressing said lasting margin against the bottom of the shoe to spread the body of adhesive as a thin layer between the lasting margin and the bottom of the shoe, the distortion of the cement resulting from the spreading action inducing crystallization and effecting orientation of the molecules of the deposited adhesive to increase the tensile strength and toughness of the adhesive.

7. The method of lasting portions of a shoe which comprises depositing adjacent the edge of the insole of a partially lasted shoe a band of molten adhesive, supercooling the deposited adhesive to a temperature below the temperature of crystal melting of the adhesive but above its second order transition temperature, promptly wiping the lasting margin of the shoe upper inwardly over and pressing said lasting margin against the bottom of the shoe to spread the body of adhesive as a thin layer between the lasting margin and the bottom of the shoe, the distortion of the cement resulting from the spreading action inducing crystallization and effecting orientation of the molecules of the deposited adhesive to increase the tensile strength and toughness of the adhesive, said adhesive comprising a linear, readily crystallizable, resinous copolyester of isophthalic and terephthalic acids with a straight chain glycol having its hydroxyl groups on terminal carbon atoms, the carbon chain of said glycol having from 2 to 6 carbon atoms.

8. The method of lasting toe portions of a shoe upper which comprises depositing adjacent the edge of the insole of a partially lasted shoe in relatively cool condition, a band of molten adhesive of sufficient volume per unit length to control loss of heat from the deposited adhesive, supercooling the adhesive to a temperature below the temperature of crystal melting of the adhesive but above its second order transition temperature, promptly wiping the lasting margin of the shoe upper inwardly over and pressing said lasting margin against the bottom of the shoe to spread the body of adhesive as a thin layer between the lasting margin and the bottom of the shoe, the distortion of the cement resulting from the spreading action effecting orientation and inducing crystallization of the molecules of the deposited adhesive to increase the tensile strength and toughness of the adhesive, said adhesive comprising a linear, readily crystallizable resinous copolyester of terephthalic and isophthalic acids in the molar ratio of from 70:30 to 90:10 with 1,4 butanediol.

9. The method of lasting toe portions of a shoe upper which comprises depositing adjacent the edge of the insole of a partially lasted shoe in relatively cool condition, a band of molten adhesive of sufficient volume per unit length to control cooling of the deposited adhesive, supercooling the adhesive to a temperature below the temperature of crystal melting of the adhesive but above its second order transition temperature, promptly wiping the lasting margin of the shoe upper inwardly over and pressing said lasting margin against the bottom of the shoe to spread the body of adhesive as a thin layer between the lasting margin and the bottom of the shoe, the distortion of the cement resulting from the spreading action inducing crystallization and effecting orientation of the molecules of the deposited adhesive to increase the tensile strength and toughness of the adhesive, said adhesive comprising a linear, readily crystallizable, resinous copolyester of terephthalic and isophthalic acids in the molar ratio of from 70:30 to 90:10 with 1,4 butanediol, having a crystal melting temperature of from 170° to 200° C. and a second order transition temperature of from 20° to 40° C.

References Cited by the Examiner
UNITED STATES PATENTS

| | | | |
|---|---|---|---|
| 2,467,385 | 4/49 | Kamborian | 12—145 X |
| 2,623,034 | 12/52 | Flory et al. | 260—75 |
| 2,633,586 | 4/53 | Osborn | 12—145 |
| 2,861,022 | 11/58 | Lundsager. | |
| 2,961,365 | 11/60 | Sroog | 260—75 |
| 2,964,437 | 12/60 | Appleton et al. | 156—295 |

ALEXANDER WYMAN, *Primary Examiner.*

HAROLD ANSHER, *Examiner.*